(12) United States Patent
Boies et al.

(10) Patent No.: US 6,502,070 B1
(45) Date of Patent: Dec. 31, 2002

(54) METHOD AND APPARATUS FOR NORMALIZING CHANNEL SPECIFIC SPEECH FEATURE ELEMENTS

(75) Inventors: Daniel Boies, Candiac (CA); Benoit Dumoulin, Montreal (CA); Stephen Douglas Peters, Quebec (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/559,459

(22) Filed: Apr. 28, 2000

(51) Int. Cl.[7] .................. G10L 19/14; G10L 19/10; G10L 21/02
(52) U.S. Cl. .................. 704/224; 704/220; 704/201
(58) Field of Search ............................. 704/224, 201, 704/200.1, 246, 251; 379/14

(56) References Cited

U.S. PATENT DOCUMENTS

| | | | | |
|---|---|---|---|---|
| 5,838,767 A | * | 11/1998 | Aoyama | 379/14 |
| 5,907,597 A | * | 5/1999 | Mark | 704/246 |
| 5,956,683 A | * | 9/1999 | Jacobs et al. | 704/251 |

OTHER PUBLICATIONS

Avendano et al ("On the Effects of Short–Term Spectrum Smoothing in Channel Normalization", IEEE Transactions on Speech and Audio Processing, Jul. 1997).*

Lerner et al ("Telephone Channel Normalization For Automatic Speech Recognition", IEEE International Conference on Acoustics, Speech, and Signal Processing, Mar. 1992).*

Richard M. Stern, Bhiksha Raj, and Pedro J. Moreno, *Compensation for Evironmental Degradation in Automatic Speech Recognition,* Proc. of the ESCA Tutorial and Research Workshop on Robust Speech Recognition for Unknown Communication Channels, Apr. 1997, Pont–à–-Mousson, France, pp. 33–42.

Pedro J. Moreno, Bhiksha Raj, Evandro Gouvêa and Richard M. Stern, *Multivariate–Gaussian–Based Cepstral Normalization for Robust Speech Recognition,* Proc. ICASSP 95 (International Conference on Acoustics Speech and Signal Processing), May 1995.

Leggetter, C.J. et al., *Maximum likehood linear regression for speaker adaptation of continuous density hiddin Markow models,* Computer Speech Language, vol. 9 (1995), pp. 171–185.

Neumeyer, Leonardo et al., *A Comparative Study of Speaker Adaptation Techniques,* Proc. of EuroSpeech '95 (Sep. 1995), pp. 1127–1130.

Schwartz, Richard et al., *Hidden Markov Models and Speaker Adaptation, Speech Recognition and Understanding: Recent Advances,* Eds: P. Laface and R. De Mori, Springer–Verlag, (1992), pp. 31–57.

Gauvain, Jean–Luc et al., *Maximum a Posteriori Estimation for Multivariate Gaussian Mixture Observations of Markov Chains, IEEE Trans. On Speech and Audio Processing,* vol. 2, No. 2 (Apr. 1994), pp. 291–298.

* cited by examiner

Primary Examiner—Richemond Dorvil
Assistant Examiner—Daniel Nolan
(74) Attorney, Agent, or Firm—Kevin L. Smith

(57) ABSTRACT

An apparatus for normalizing speech feature elements in a signal derived from a spoken utterance. The apparatus includes an input, a processing unit and an output. The input receives speech feature elements transmitted over a channel that induces a channel specific distortion in the speech feature elements. The processing unit is coupled to the input and is operative for altering the speech feature elements to generate normalized speech feature elements. The normalized speech feature elements simulate a transmission of the speech feature elements over a reference channel that is other than the channel over which the transmission actually takes place. The apparatus can be used as a speech recognition pre-processing unit to reduce channel related variability in the signal on which speech recognition is to be performed.

38 Claims, 8 Drawing Sheets

METHOD AND APPARATUS FOR NORMALIZING CHANNEL SPECIFIC SPEECH FEATURE ELEMENTS

FIELD OF THE INVENTION

This invention relates to the field of speech recognition and more particularly to a method and apparatus for normalizing channel specific feature elements in a signal derived from a spoken utterance. In general the method aims to compensate for changes induced in the feature elements of the signal as a result of a transmission of the signal through a certain communication channel.

BACKGROUND OF THE INVENTION

In a typical speech recognition application, the user inputs a spoken utterance into an input device such as a microphone or telephone set. If valid speech is detected, the speech recognition layer is invoked in an attempt to recognize the unknown utterance. In a commonly used approach, the input speech signal is first pre-processed to derive a sequence of speech feature elements characterizing the input speech in terms of certain parameters. The sequence of speech feature elements is then processed by a recognition engine to derive an entry from a speech recognition dictionary that most likely matches the input speech signal. Typically, the entries in the speech recognition dictionary are made up of symbols, each symbol being associated to a speech model.

Prior to the use of a speech recognition system, the entries in the speech recognition dictionary as well as the speech models are trained to establish a reference memory and a reference speech model set. For speaker-independent systems, training is performed by collecting samples from a large pool of users. Typically, for a speaker-independent system, a single speech model set is used for all speakers while in a speaker-specific system, each user is assigned a respective speech model set. Speaker-specific systems are trained by collecting speech samples from the end user. For example, a voice dictation system where a user speaks and the device translates his words into text will most likely be trained by the end user (speaker-specific) since this training fashion can achieve a higher recognition accuracy. In the event that someone else than the original user wants to use the same device, that device can be retrained or an additional set of speech models can be trained and stored for the new user. As the number of users becomes large, storing a separate speaker specific speech model set for each user becomes prohibitive in terms of memory requirements. Therefore, as the number of users becomes large, speech recognition systems tend to be speaker independent.

In addition to interacting with different users, it is common for a speech recognition system to receive the signal containing the spoken utterance on which the speech recognition process is to be performed over different communication channels. In a specific example, a speech recognition system operating in a telephone network may process speech signals originating from a wireline communication channel or wireless communication channel, among others. Generally, such speech recognition systems use a common speech model set across the different communication channels. However, the variability between communication channels results in variability in the acoustic characteristics of the speech signals. Consequently, the recognition performance of a speech recognition system is adversely affected since the speech models in the common speech model set do not reflect the acoustic properties of the speech signal, in particular the changes induced in the signal by the channel used for transporting the signal. Since different channels can be used to transport the signal toward the speech recognition apparatus, and each channel induces different changes in the signal it is difficult to adapt the speech models such as to accurately compensate for such channel specific distortions introduced in the feature elements.

A commonly used technique to overcome this problem is exhaustive modeling. In exhaustive modeling, each communication channel that the speech recognition system is adapted to support is associated to a channel specific speech model set. For each channel, a plurality of speech samples are collected from the end-users in order to train a channel specific speech model set.

A deficiency in exhaustive modeling is that it requires a large amount of training data for each communication channel. This represents an important commissioning expense as the number of environmental and channel conditions increases.

Another common approach to improve the performance of speech recognition systems is adaptation: adjusting either speech models or features in a manner appropriate to the current channel and environment. A typical adaptation technique is model adaptation. Generally, model adaptation starts with reference speech models derived from one or more spoken utterances over a reference communication channel (say wireline communication channel) and then, based on a small amount of speech from a new communication channel (say a wireless communication channel), new channel-specific models are iteratively generated. For a more detailed explanation on model adaptation, the reader is invited to consult R. Schwartz and F Kubala, Hidden Markov Models and Speaker Adaptation, Speech Recognition and Understanding: Recent Advances, Eds: P. Laface et R. De Mori, Springer-Verlag, 1992; L. Neumeyer, A. Sankar and V. Digalakis, A Comparative Study of Speaker Adaptation Techniques, Proc. Of EuroSpeech '95, pp. 1127–1130, 1995; J.-L. Gauvain, G.-H. Lee, Maximum a Posteriori Estimation for Multivariate Gaussain Mixture Observations of Markov Chains, IEEE. Trans. on Speech and Audio Processing, Vol.2, April 1994, pp. 291–298; and C. J. Leggetter, P. C. Woodland, Maximum Likelihood Linear Regression for Speaker Adaptation of Continuous Density Hidden Markov Models, Computer, Speech and Language, Vol.9, 1995, pp. 171–185. The content of these documents is hereby incorporated by reference.

A deficiency in the above-described methods is that, in order to obtain channel-specific models providing reasonable performance, a relatively large amount of data that may not be readily available is required.

Consequently, there is a need in the industry for providing a method and apparatus to compensate for channel specific changes induced in the feature elements of a signal derived from a spoken utterance, the signal being intended for processing by a speech recognition apparatus.

SUMMARY OF THE INVENTION

In accordance with a broad aspect, the invention provides an apparatus for normalizing speech feature elements in a signal derived from a spoken utterance. The apparatus has an input for receiving the speech feature elements which are transmitted over a certain channel. The certain channel is a path or link over which data passes between two devices and is characterized by a channel type that belongs to a group of N possible channel types. Non-limiting examples of possible channel types include a hand-held channel (a path or link established by using a hand-held telephone set), a wireless channel (a path or link established by using a wireless telephone set) and a hands-free channel (a path or link established by using a hands-free telephone set) among a number of other possible channel types.

The apparatus includes a processing unit coupled to the input. The processing unit alters or skews the speech feature elements to simulate a transmission over a reference channel that is other than the channel over which the transmission actually takes place.

The signal output by the apparatus is suitable for processing by a speech recognition apparatus.

One of the benefits of this invention is an increase of the speech recognition accuracy by a reduction in the variability introduced in the speech signal on which the recognition is made by the particular channel over which the signal is transmitted.

The reference channel can correspond to a real channel (for example, the hands-free channel) or it can be a virtual channel. Such a virtual channel does not physically exist. It is artificially defined by certain transmission characteristics that are arbitrarily chosen.

In a specific non-limiting example of implementation, the processing unit classifies a speech feature element that contains channel specific distortions in a class of speech feature elements selected from a set of possible classes of speech feature elements. This classification is done at least in part on the basis of acoustic characteristics of the speech feature element. The processing unit then derives transformation data from a set of possible transformation datum on the basis of the class to which the feature element has been assigned. The processing unit processes the feature element containing the channel specific distortion on the basis of the transformation data to generate a normalized speech feature element.

In accordance with another broad aspect, the invention provides a method for normalizing speech feature elements in a signal derived from a spoken utterance. The method comprises receiving the speech feature elements transmitted over a certain channel, the certain channel being characterized by a channel type that belongs to a group of N possible channel types. The method includes altering the speech feature elements at least in part on the basis of the channel type to generate normalized speech feature elements. The normalized speech feature elements simulate a transmission of the speech feature elements over a reference channel that is other than the channel over which the actual transmission takes place.

In accordance with another broad aspect, the invention provides a computer readable medium comprising a program element suitable for execution by a computing apparatus for implementing the above-described method.

In accordance with another broad aspect, the invention further provides a computer readable storage medium holding a data structure that stores of a plurality of transformation sets. Each transformation set is associated to an identifier allowing uniquely distinguishing the transformation sets from one another. Each transformation set includes at least one transformation data element allowing normalizing a speech feature element.

In accordance with another broad aspect, the invention provides an apparatus for generating a transformation set associated to a given communication channel. The apparatus has a stereo database, a processing unit and an output. The stereo database includes a plurality of data element pairs, each data element pair being derived from a spoken utterance. Each data element pair includes a first data constituent derived from the spoken utterance conveyed over a reference communication channel and a second data constituent derived from the spoken utterance conveyed over the given communication channel.

The processing unit is coupled to the stereo database. The processing unit groups the data element pairs to generate a set of classes. A certain data element pair is associated to a certain class at least in part on the basis of acoustic characteristics of the certain data element pair. The processing unit then processes the set of classes generated to derive a transformation set, the transformation set including a plurality of transformation data elements.

For the purpose of this specification, the expression "speech feature element" is used to designate an element that alone or in combination with other such elements characterizes or defines acoustically speech sound information. Examples of speech feature elements include feature vectors. The feature vectors may be comprised of spectral parameters, audio signal segments, band energies and cepstral parameters, among others.

Other aspects and features of the present invention will become apparent to those ordinarily skilled in the art upon review of the following description of specific embodiments of the invention in conjunction with the accompanying figures.

DETAILED DESCRIPTION

Figure 1:
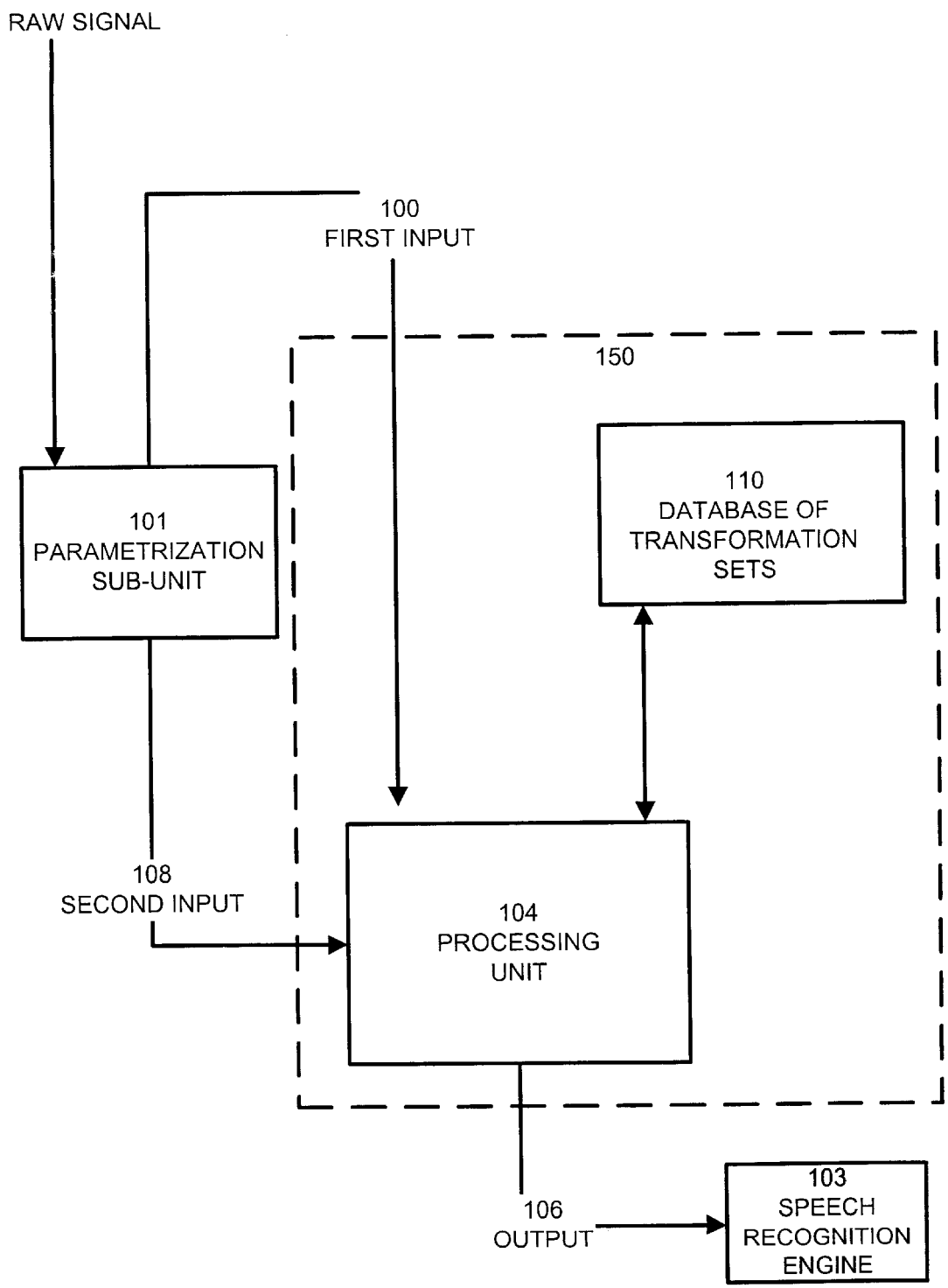
FIG. 1 is a block diagram of an apparatus for generating a normalized speech feature element in accordance with a specific example of implementation of the invention.

A first non-limiting example of implementation of the invention is shown in FIG. 1. The apparatus 150 illustrated in FIG. 1 has the function of normalizing speech feature elements in a signal derived from a spoken utterance. That signal carries distortions resulting from the transmission of the signal over a certain communication channel. These distortions are channel specific in that they depend upon the type of channel used for the transmission of the signal. If the signal was transmitted over a different type of channel, the distortions induced in the signal would be different.

The apparatus 150 comprises a number of components, namely a first input 100, a processing unit 104 and an output

106. The apparatus 150 also includes a second input 108 and a database of transformation sets 110. External to the apparatus 150 is a parameterization subunit 101 that receives the raw signal containing the speech sound information. The raw speech signal could be in Pulse Code Modulation (PCM) format or any other suitable format. The parameterization subunit 101 will process the signal and extract the speech feature elements. The signal with the speech feature elements is supplied to the first input 100 and to the second input 108.

In a non-limiting example the feature elements in the signal applied at the first input 100 and to the second input 108 are feature vectors. The feature vectors comprise a plurality of data elements such as spectral parameters (e.g. Mel-based spectral parameters). Other possibilities for feature vectors include audio signal segments, spectrum data and band energies, among others.

The channel, over which the signal that includes the speech feature elements is transmitted to the parameterization subunit 101, is characterized by a channel type selected in a group of N possible channel types. Generally, a channel type is characterized by the distortions that the channel will introduce in the signal. Generally, each modem type, CODEC type or combination of the two may represent a distinct channel type. The following is a non-exhaustive list of possible channel types: wireless, wireline and hands free among others.

The function of the processing unit 104 is to normalize the signal containing speech feature elements received at the first input 100. Broadly stated, the processing unit 104 uses transformation data elements supplied by the database of transformation sets 110 to alter the channel specific distortions in the signal containing the speech feature elements.

The processing unit 104 has an output 106 for releasing data representative of the normalized speech feature elements in a format suitable for processing by a speech recognition device 103. Stated otherwise, the output 106 of the processing unit 104 would normally be applied to the input of a speech recognition device 103 such that a speech recognition operation can be performed. Advantageously, the speech recognition device 103 uses a model set that is adapted to the characteristics of a reference channel type, the reference channel type being a channel, either a physical channel or a virtual channel that would induce in the signal containing the speech feature elements distortions that are the same or close to the distortions in the signal of normalized speech feature elements.

The database of transformation sets 110 is a data structure storing at least one transformation data element. The transformation data element is indicative of a channel specific transformation operation and allows the processing unit 104 to derive, convert or compute a speech feature element that has been subjected to a channel specific distortion to a normalized speech feature element. More specifically, the data structure is stored in a computer readable storage medium unit that supplies the information to the processing unit 104. In a specific example of implementation, the database of transformation sets 110 is such as to associate a plurality of transformation sets to respective channels. The transformation set associated to a given channel includes a plurality of transformation data elements that in turn are associated to respective classes of speech feature elements. Each transformation data element is an information component allowing the processing unit 104 to derive, compute or convert a speech feature element in the signal bearing channel-specific distortions to a normalized speech feature element.

In a specific form of implementation, each class of speech feature elements is characterized by a set of acoustic characteristics. The acoustic characteristics for each class may be represented by an average speech feature element indicative of an average of the acoustic characteristics.

The organization of the database of transformation sets 110 is such that it allows a speech feature element to be normalized to first be matched to a channel type and then to a class under this channel type. This allows retrieving the transformation data element to be used to obtain the normalized speech feature element.

As a possible variant, the classes in the database of transformation sets 110 are omitted. Under this approach, the transformation data elements are associated to channel types only. In use, a speech feature element to be normalized is matched to the channel type and the transformation data element is directly extracted.

Figure 2:
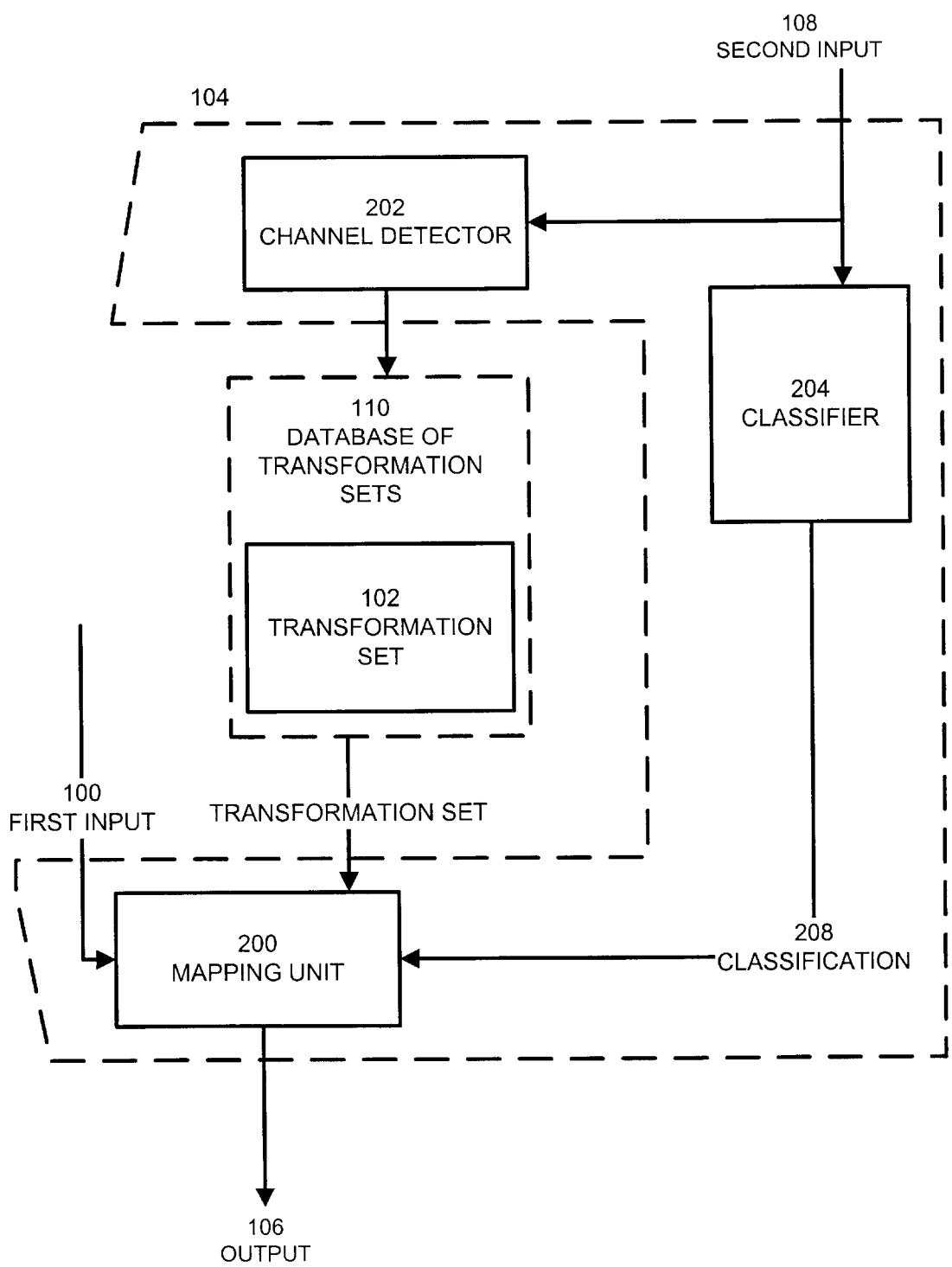
FIG. 2 is a more detailed block diagram of the apparatus depicted in FIG. 1.

The processing unit 104 is shown in greater detail in FIG. 2 of the drawings. The processing unit 104 includes a mapping unit 200, a channel detector 202 and a classifier 204.

The channel detector 202 is coupled to the second input 108. The channel detector 202 processes the speech signal containing the speech feature elements to identify the channel type over which the signal was transmitted. In general, channel detection and identification is a technique well known to those skilled in the art to which this invention pertains. Accordingly, it is not deemed necessary to provide a further description of the functional block 202.

The classifier 204 is coupled to the second input 108 and also receives the signal containing the speech feature elements.

The classifier 204 is coupled to the second input 108 and it also receives the signal containing the speech feature elements.

The classifier 204 classifies each speech feature element in the signal in a class of speech feature elements selected from a set of possible classes of speech feature elements. The classification is effected at least in part on the basis of the acoustic characteristics of the speech feature element. In a specific example of implementation, the classifier 204 has a data structure including a standard speech feature element for each possible class in the set of possible classes. The standard speech feature element is indicative of an average of the acoustic characteristics for the speech feature element of the respective class. For each channel specific speech feature element received at the second input 108, the classifier 204 performs a likelihood calculation with each standard speech feature element and selects the best match. The classifier 204 then releases a data element 208 indicative of the class assigned to the speech feature element.

Among the matching algorithms that can be use to assign speech feature elements to respective classes, classifiers based on context-dependent decision tree allophones and the GMM (Gaussian Mixture Model) classifier are good choices. These type of classifiers are well known in the art to which this invention pertains. An advantage of making use of a classifier based on context-dependent decision tree allophones is that it takes into account correlations introduced by a communication channel. It will be readily apparent to a person skilled in the art that other types of classification algorithms can be used without departing from the spirit of the invention.

Alternatively, the classifier 204 performs the classification on the basis of speech feature elements that are different from those in the signal that is applied to the first input 100.

Under this variant, the classifier is modified to receive the raw speech signal and then pre-process the raw speech signal to extract the speech feature elements on which the classification is to be made.

Figure 3:
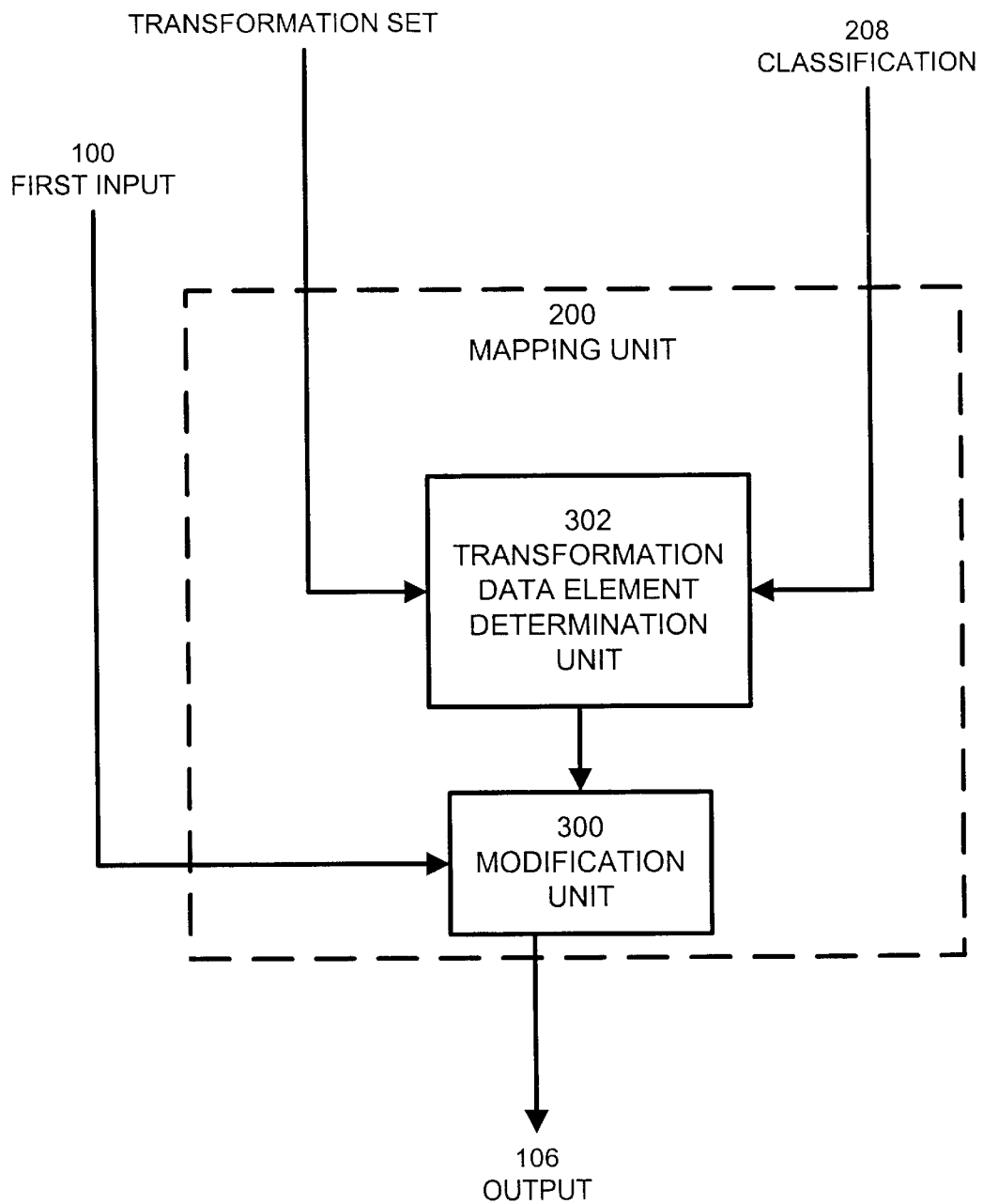
FIG. 3 is a block diagram of a mapping unit depicted in FIG. 2.

The mapping unit 200 is shown in more detail in FIG. 3. In this example, the mapping unit 200 includes a transformation data element determination unit 302 and a modification unit 300.

The transformation data element determination unit 302 receives from the database of transformation sets 110 the set of transformation data elements associated with the channel type identified by the channel detector 202. This set of transformation data elements is analogous to a table establishing a relationship between individual transformation data elements and classes of speech feature elements. The transformation data element determination unit 302 also receives the classification data element 208 derived by the classifier 204 for the currently processed speech feature element. The transformation data element determination unit 302 uses the classification data element 208 to extract the transformation data element from the set of transformation data elements applicable to the currently processed speech feature element. In the example where the set of transformation data elements 250 is a table, the classification data element 208 may be in the form of an index allowing to retrieve from the set of transformation data elements the transformation data element corresponding to the currently processed speech feature element.

The transformation data element extracted by the transformation data element determination unit 302 may be in the form of one or more parameters. The one or more parameters need to be inputted into a formula, known or available at the modification unit 300, that describes the operations that need to be performed on the currently processed speech feature element to normalize it. Alternatively, the extracted transformation data element is the mathematical statement with or without parameters that the modification unit 300 will apply to the currently processed speech feature element such as to normalize it.

The modification unit 300 processes the speech feature element received at the first input 100 on the basis of the given transformation data element derived by the transformation data element determination unit 302. The modification unit 300 generates a normalized speech feature element associated to the currently processed speech feature element.

The modification unit 300 implements a parametric transformation operation. Generally, the modification unit 300 performs a piecewise estimation that captures the correlation introduced by the channel over which the speech feature element to be processed was transmitted. Mathematically, a general form of the computation effected by the modification unit 300 can be expressed as follows:

$$x_i = T_c(z_i, z_{i-1}, \ldots, z_{i-r}) \quad (1)$$

where $x_i$ and $z_i$ are respectively the normalized speech feature element and the speech feature element containing the channel specific distortions at frame i, r is a measure of the correlation duration in effect for each class c, and $T_c$ is a transformation operation. A way to capture the correlation introduced by the channel is to consider a transformation between superframes of the form $$\tilde{z}_i = z_{i-N} \oplus \ldots \oplus z_{i+N} \quad (2)$$

where $\oplus$ is the concatenation operation.

For the purpose of simplicity, the following form could be used:

$$x_i = T_c(\tilde{z}_i) \quad (3)$$

The modification unit 300 may be configured to implement a linear transformation where the parameters of the linear transformation are provided by the transformation data element determination unit 302. Mathematically, the transformation can be expressed as follows:

$$T_c(\tilde{z}_i) = M_c \tilde{z}_i + b_c \quad (4)$$

where $\tilde{z}_i$ is the channel specific speech feature element at frame i and $b_c$ and $M_c$ are the transformation parameters provided by the transformation data element determination unit 302. The determination of $b_c$ and $M_c$ will be described further on in the specification.

An advantage of making use of transformation parameters is that a reduction in computational complexity can be achieved since a single computation form for the modification unit 300 is used. It will be readily appreciated that parametric transformation operations other that linear transformations can be used without detracting from the spirit of the invention.

As a variant, different transformation operations can be used for different classes. In this variant the transformation data element extracted by the transformation data element determination unit 302 and sent to the modification unit 300 includes the mathematical statement, such as the linear transformation or any other transformation necessary to process the speech feature element, along with any of the necessary parameters. An advantage of this variant is that an increase in accuracy can be achieved by providing a transformation operation that is specifically tailored to the class to which the currently processed feature element belongs.

In a possible variant, the modification unit 300 implements a non-parametric normalization operation. Under this variant, the modification unit 300 includes a codebook having a plurality of entries indicative of speech feature elements. Each entry in the codebook includes a first constituent that is a normalized speech feature element and a second constituent that is a speech feature element including a channel specific distortion. In this form of implementation, the processing unit 104 looks for a best match between the currently processed speech feature element and the second constituents in the codebook. When a best match is found the codebook outputs the first constituent (normalized speech feature element) that corresponds to the second constituent found to best match the currently processed speech feature element. The normalized speech feature element is then released at the output 106.

Figure 4:
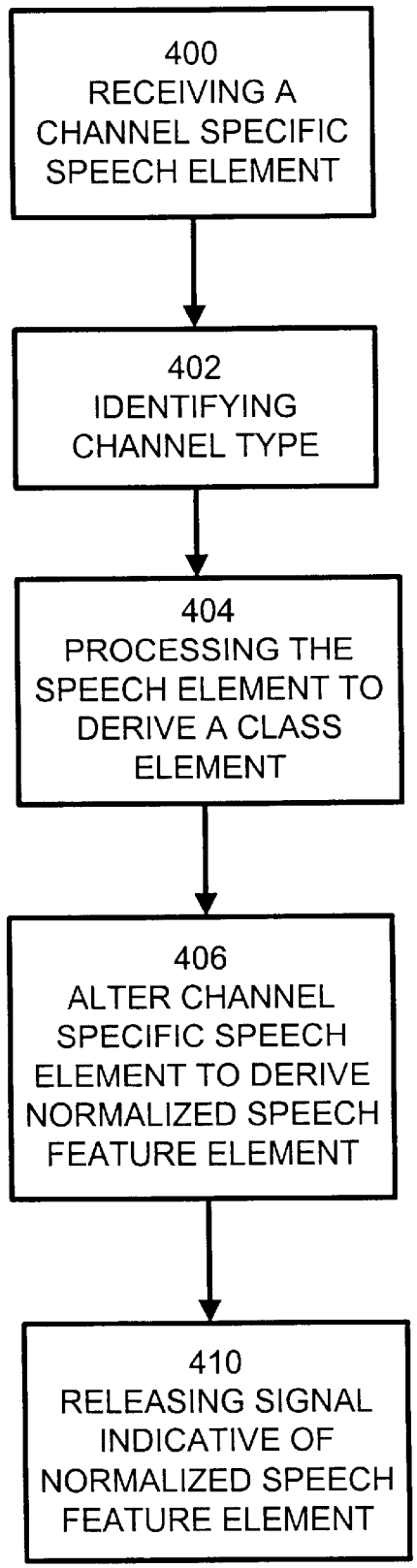
FIG. 4 is a flow diagram of a method for generating a normalized speech feature element in accordance with an example of implementation of the invention.

In a typical interaction, as shown in FIG. 4, a speech feature element is received 400, the speech feature element being obtained from a signal derived from a spoken utterance transmitted over a certain channel. The certain channel is characterized by a channel type selected in a group of N possible channel types. The speech feature element has a channel specific distortion. The signal including the speech feature element is processed at 402 to identify the channel type of the channel over which the speech feature element has been transmitted. The speech feature element is then processed at 404 such as to assign to the speech feature element a class from a group of possible classes. At step 406, the speech feature element is processed on the basis of the channel type and the class to derive a normalized speech feature element associated to a reference channel that is other than the certain channel. Data representative of the normalized speech feature elements is then released 410 at the output 106 in a format suitable for processing by a speech recognition device.

Figure 8:
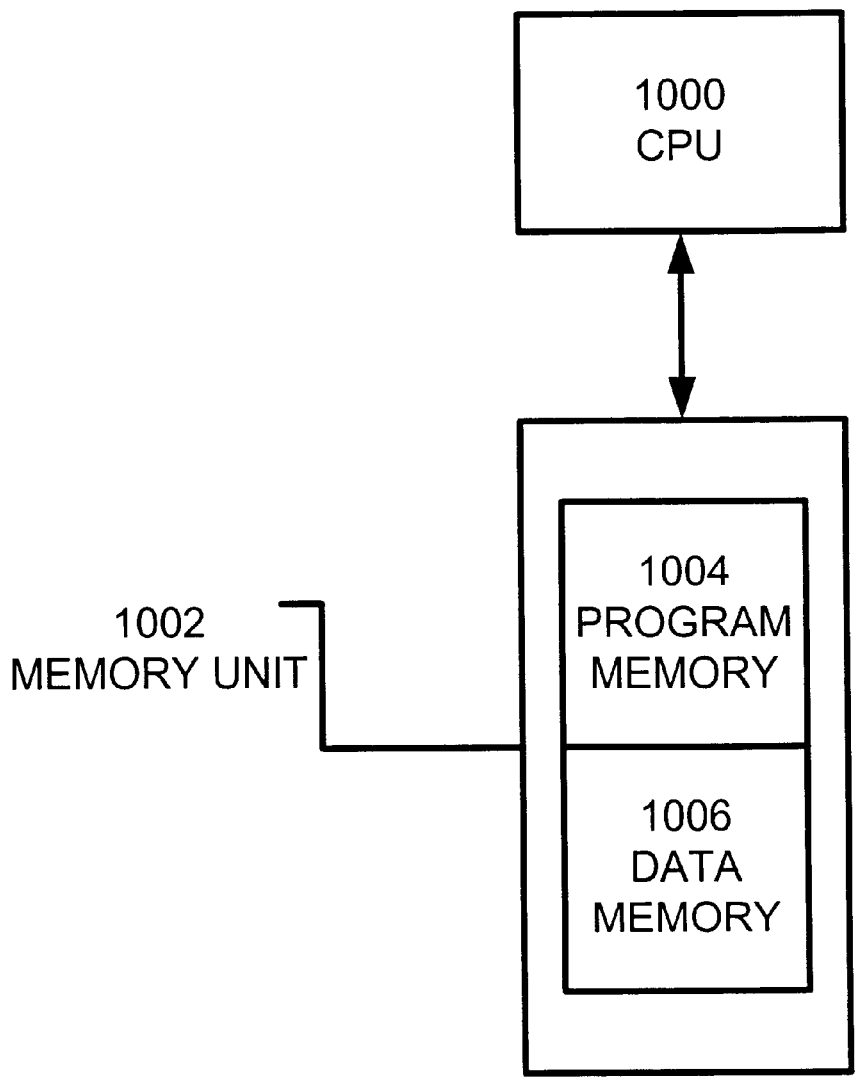
FIG. 8 is a block diagram a computing apparatus including a program element for generating a normalized speech feature element in accordance with an example of implementation of the invention.

The apparatus depicted in FIG. 1 can be implemented on a digital computing apparatus of the type depicted in FIG. 8. Such a computing apparatus comprises a processor 1000 coupled to a memory unit 1002, the memory unit 1002 comprising a program memory 1004 portion storing one or more program elements suitable to be executed by the processor 1000 for implementing the functionality of the processing unit 104 (shown in FIG. 1). The memory unit 1002 further comprises a data memory 1006 portion for storing the transformation set 102 (shown in FIG. 2) and optionally the database of transformation sets 110 (shown in FIG. 2). As a variant, the processing unit 1000 is a hardware device.

Figure 5:
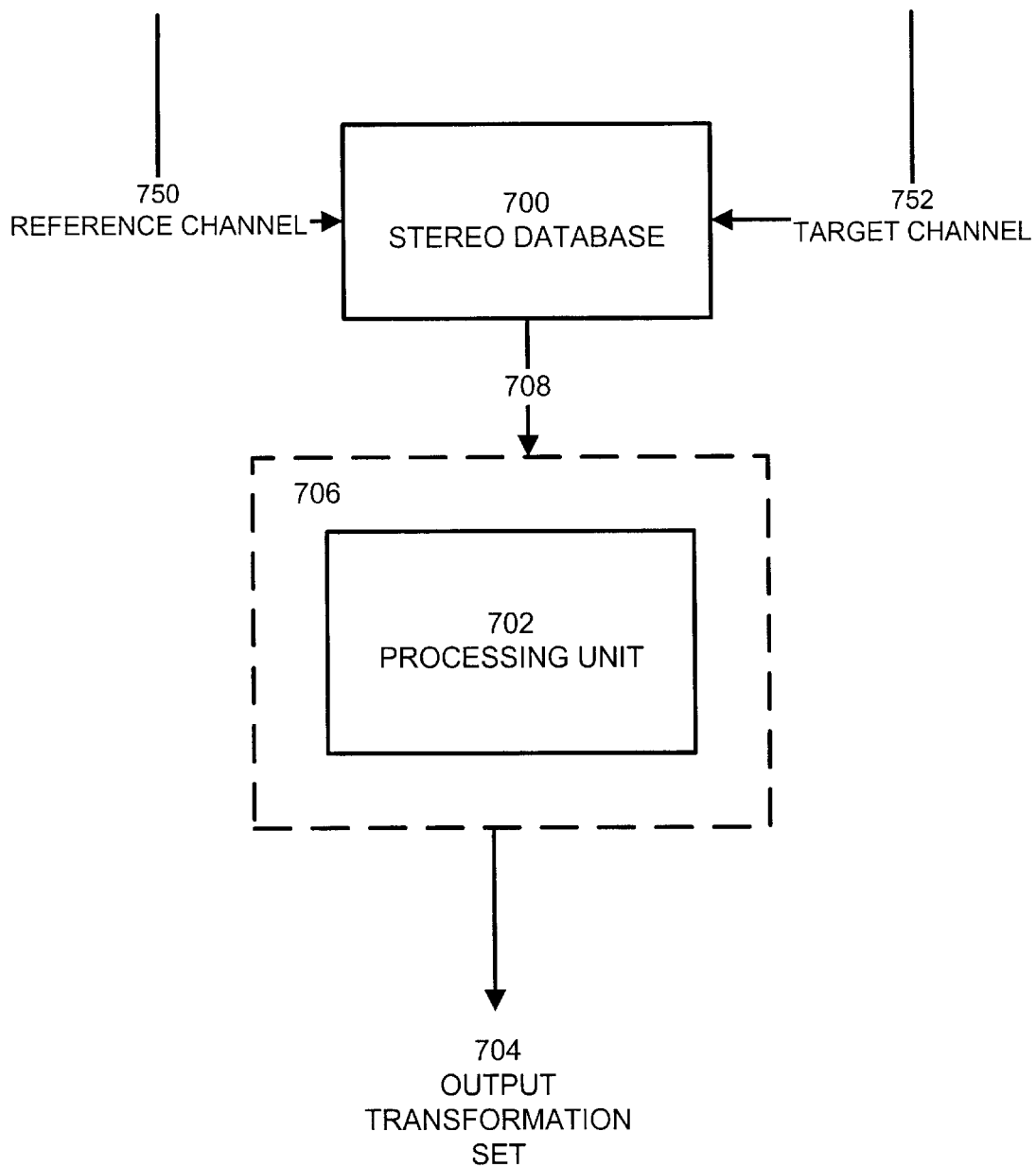
FIG. 5 is a block diagram of an apparatus for generating a transformation set in accordance with an example of implementation of the invention.

FIG. 5 illustrates an apparatus constructed in accordance with another aspect of the invention. The apparatus 706 generates a transformation set associated to a given communication channel. The apparatus 706 can be used to provide the database of transformation sets 110 (shown in FIG. 1) described previously.

The apparatus 706 comprises an input 708, a processing unit 702 and an output 704.

The input 708 receives a plurality of data element pairs, each data element pair being derived from a spoken utterance. In a specific example of implementation, this is effected through the intermediary of a computer readable storage medium storing a stereo database 700 coupled to the apparatus 706 via the input 708. The stereo database 700 contains a plurality of data element pairs. Each data element pair includes a first constituent derived from a spoken utterance conveyed over a reference communication channel and a second constituent derived from a spoken utterance conveyed by a target communication channel for which a transformation set is desired.

In a specific and non-limiting example, each data element pair is generated by simultaneously recording speech samples over two channels of interest. The first channel 750, herein referred to as the reference channel, is indicative of the channel on which a large amount of available speech data has been collected and on which speech models have been generated. The second communication channel 752, herein referred to as the target channel, is indicative of a communication channel in which an improvement in recognition performance is sought.

For clarity, in the context of the apparatus 150 described earlier with reference to FIGS. 1 and 2, the reference channel is the normalized channel and the target channel corresponds to the channel conveying the speech feature elements to be normalized.

The first and second constituents of the data element pairs may be in the form of speech tokens, in the form of feature vectors derived from speech tokens or in any other representation providing acoustical information on the speech sound information, without detracting from the spirit of the invention. In a specific example of implementation, the first and second constituents are feature vectors including cepstral parameters.

The processing unit 702 is operative for processing the data element pairs in the stereo database 700 to derive a transformation set.

In a first form of implementation, herein referred to as non-parametric estimation, the processing unit 702 tabulates the data element pairs in the stereo database 700. As a variant, a quantization codebook can be generated to reduce the number of entries to be looked-up during normalization. Each entry in the codebook includes a first constituent associated to the reference channel and a second constituent associated to the target channel. The content of the codebook constitutes the transformation set.

Figure 7:
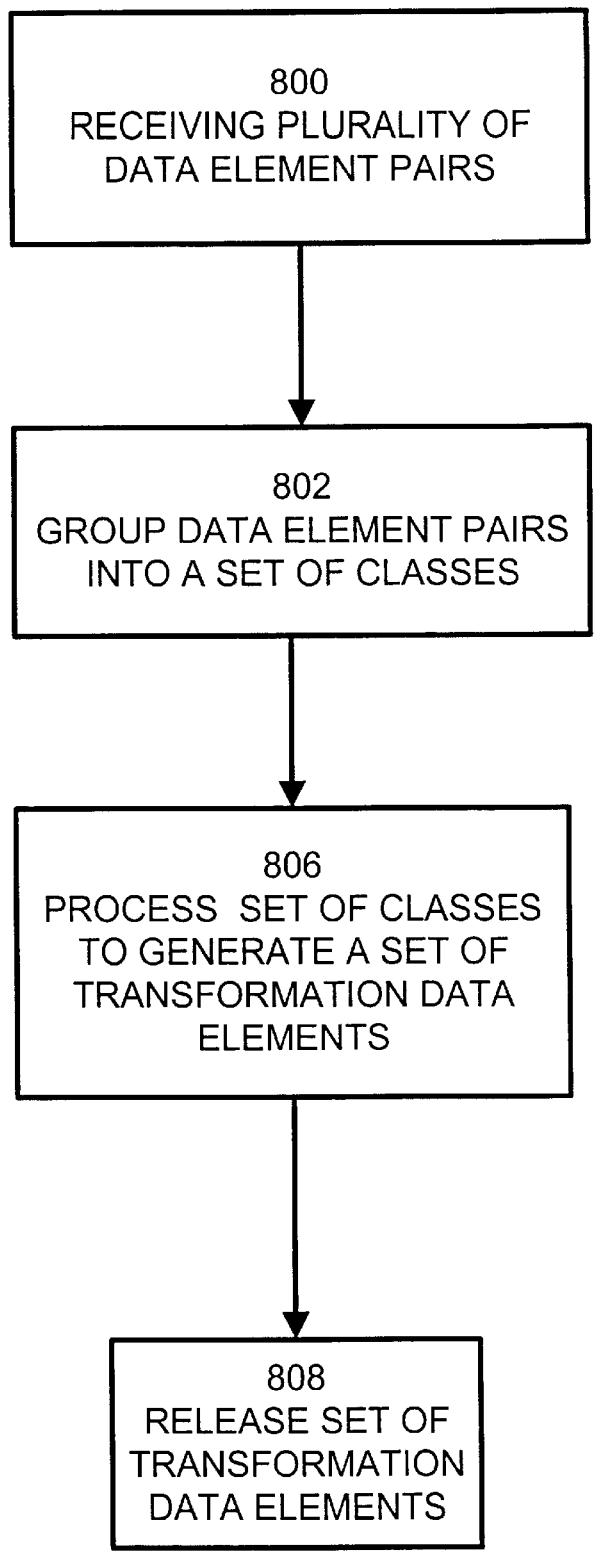
FIG. 7 is a flow diagram of a method for generating a transformation set in accordance with an example of implementation of the invention.

In a second form of implementation, herein referred to as parametric estimation, the functionality of the processing unit 702 will be best understood in connection with FIG. 7 of the drawings. As shown, the processing unit receives at 800 a plurality of data element pairs and then groups 802 them into a set of classes. In a specific example of implementation, the grouping is effected on a basis of the acoustic characteristics of the first constituent of the data element pair. Algorithms such as the k-means algorithm can be used here. The particular classes in which the data element pairs are grouped may be voiced/non-voiced based, phoneme based classes or any other classification based on the acoustic characteristic of the first members of the data element pair. In a specific implementation, the classes are derived on the basis of the acoustic characteristic of the first constituents (received over the reference communication channel) irrespective of the underlying phoneme corresponding to it. In another specific example, the classification is based on context-dependent decision tree allophones. In yet another specific example, the classification is based on a Gaussian Mixture Model (GMM) performing a frame level classification. The reader is invited to consult "Pattern Classification and Scene Analysis", 1973, by R. O. Duda and P. E. Hart which describes classification methods. The contents of this document are hereby incorporated by reference.

Each class in the set of classes is processed 806 to generate a transformation data element. The transformation data element establishes a mapping between second constituents and first constituents of data element pairs in the respective class. In other words, the data element pairs that belong to a given class contribute to the transformation data element for that given class.

The transformation data element generated is indicative of an estimation that captures the distortion introduced by the communication channel. Mathematically, the transformation data element can be expressed as a multivariate mapping of the form:

$$X_i = T(z_i, z_{i-1}, \ldots, z_{i-r}) \quad (1)$$

where $x_i$ is a first constituent of a data element pair (derived from the reference channel) and $z_i$ is a second constituent of a data element pair (derived from the target channel) at frame i; r is a measure of the correlation duration in effect for each class c. In a specific example, to achieve a capture of the correlation introduced by the target channel, a transformation between superframes is used of the form:

$$\tilde{z}_i = z_{i-N} \oplus \ldots \oplus z_{i+N} \quad (2)$$

where $\oplus$ is the concatenation operation.

In a specific example of implementation, the correlation effect r is set to 0 and the transformation data element can be expressed as a multivariate mapping of the form:

$$x_i = T_c(z_i) \quad (3)$$

The above form allows a reduction in the computational requirements associated with the estimation of a superframe mapping.

In another specific example of implementation, the transformation data element is indicative of a linear transformation. The person skilled in the art will readily appreciate that transformations other than linear may be used without detracting from the spirit of the invention.

For each class c a linear transformation is defined of the form:

$$T_c(z_i) = M_c z_i + b_c$$

where $z_i$ and $b_c$ are d-dimensional column vectors and $M_c$ is a d×d matrix where d is the number of member of a speech feature element. In a very specific example, the parameters $M_c$ and $b_c$ are derived by applying a Minimum Mean Square Error (MMSE) estimation on the basis of the cost function:

$$\sum_{i \in \chi_c} (x_i - M_c z_i - b_c)^T (x_i - M z_i - b_c)$$

where $\chi_c$ is the set of entries belonging in a given class c. For each class c, sample averages of the second members and first members of data element pairs are computed namely $\tilde{x}$ (first members received over the reference channel) and $\tilde{z}$ (second members received over the target channel). In this specific example, the Minimum Mean Square Error estimation results in the following:

$$M_c = (ZZ^T - N_c \tilde{z}\tilde{z}^T)^{-1}(ZX^T - N_c \tilde{z}\tilde{x}^T)$$
$$b_c = \tilde{x} - M_c \tilde{z}$$

where X and Z are the d×$N_c$ reference and target data matrices while $\tilde{x}$ and $\tilde{z}$ are the sample averages over $\chi_c$ of the reference and target feature vectors respectively, and $N_c$ is the number in the set $\chi_c$. In a specific example, the transformation data element is chosen to be simply additive in which case it reduces to:

$$M_c = I_d$$
$$b_c = \tilde{x} - \tilde{z}$$

where $I_d$ is the identity matrix of size d×d. The parameters $M_c$ and $b_c$ derived in the specific implementation described form the transformation data element for a given respective class.

Figure 6:
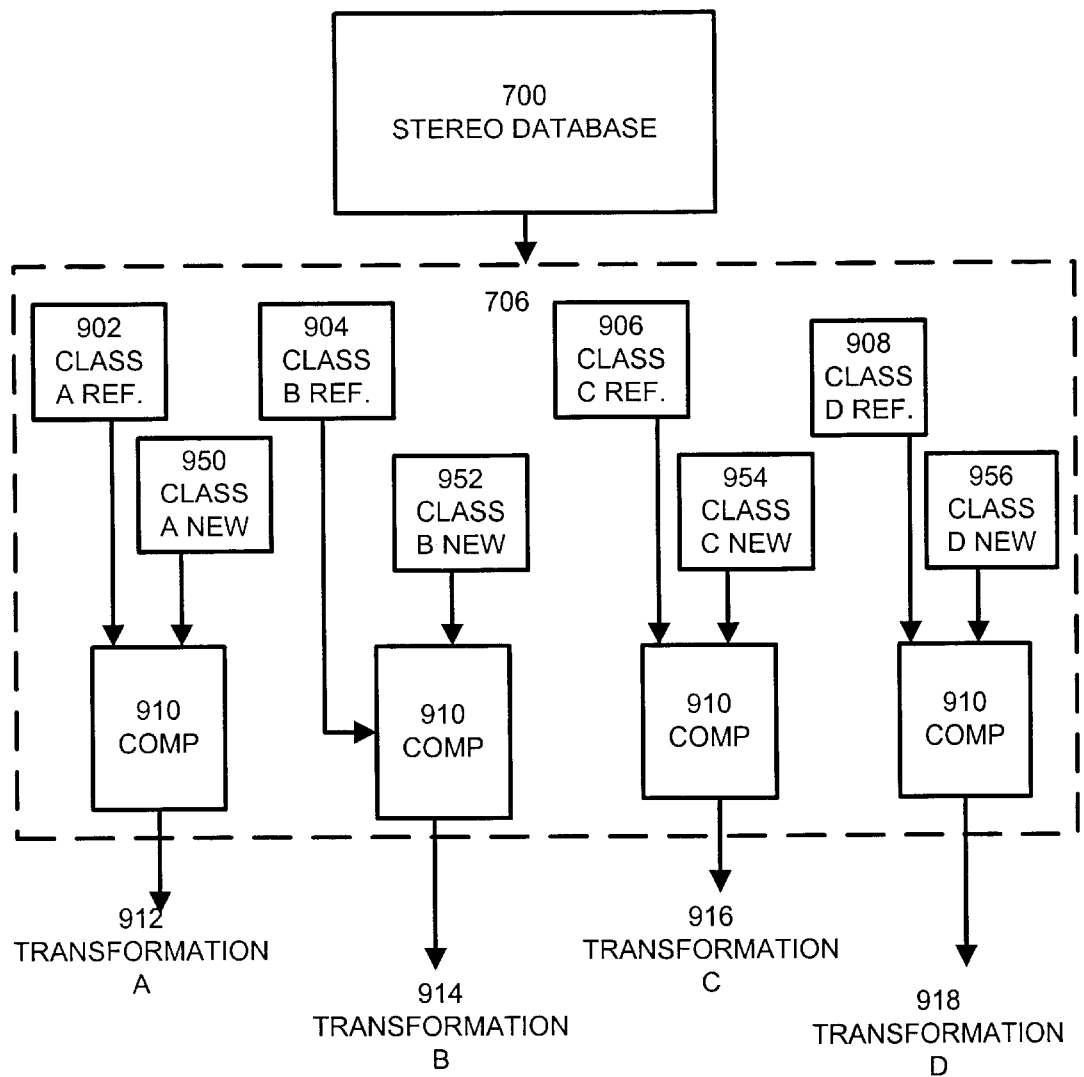
FIG. 6 is a detailed block diagram of the apparatus of FIG. 5.

FIG. 6 shows a conceptual diagram of the processing unit 702 in accordance with the second form of implementation. As shown, a set of classes namely class A, B, C, and D have been generated, each class having respective data element pairs (902 and 950); (904 and 952); (906 and 954) and (908 and 956). Each class is then processed by a transformation generator unit 910 which processes each class to generate a respective transformation data element 912, 914, 916 and 918.

The output 704 releases at step 808 a signal indicative of a set of transformation data elements each one of which is associated to a respective speech feature element class. Each transformation data element allows deriving a normalized speech feature element on a basis of a channel specific speech feature element.

The above-described apparatus for generating a transformation set described in the specification can also be implemented on any suitable computing platform. Such a computing platform typically includes a processor and a memory or computer readable medium connected to the processor by a data communication bus. The memory stores the data and the instructions of the program element implementing the functional blocks depicted in the drawings and described in the specification. In a specific example, the program element implements the processing unit 702. In another specific example, the program element is operative for implementing the transformation generators 910. In a specific example, the stereo database is stored in the data portion of the memory. The program element operates on the data in the stereo database in accordance with the algorithms described above to generate a transformation set using the techniques described in this specification.

Although the present invention has been described in considerable detail with reference to certain preferred embodiments thereof, variations and refinements are possible without departing from the spirit of the invention. Therefore, the scope of the invention should be limited only by the appended claims and their equivalents.

What is claimed is:

1. An apparatus for normalizing speech feature elements in a signal derived from a spoken utterance, said apparatus comprising:

a) an input for receiving the speech feature elements transmitted over a certain channel, the certain channel being characterized by a channel type that be longs to a group of N possible channel types, N being an integer of at least 1;

b) a processing unit coupled to said input, said processing unit being operative for altering the speech feature elements at least in part on the basis of a data element indicative of the channel type of the certain channel to generate normalized speech feature elements, the normalized speech feature elements simulating a transmission of the speech feature elements in the signal derived from the spoken utterance over a reference channel that is other than the certain channel;

c) an output coupled to said processing unit for releasing data representative of the normalized speech feature elements.

2. An apparatus as defined in claim 1, wherein said processing unit is operative for:

a) assigning a certain speech feature element in the signal derived from a spoken utterance to a certain class of speech feature elements selected from a set of, possible classes at least in part on a basis of acoustic characteristics of the given speech feature element, n being an integer of at least 1;

b) utilizing data indicative of the given class for generating a normalized speech feature element associated to the certain speech feature element.

3. An apparatus as defined in claim 2, including a data structure for storage of a plurality of transformation data elements, said processing unit being operative to extract from said data structure at least in part on the basis of the channel type of the certain channel and at least in part on the basis of the data indicative of the certain class a certain transformation data element and said processing unit being operative to process the certain transformation data element and the certain speech feature element to generate the normalized speech feature element associated to the certain speech feature element.

4. An apparatus as defined in claim 3, wherein each transformation data element in said data structure is associated to a respective class of speech feature elements.

5. An apparatus as defined in claim 4, wherein the certain transformation data element is used by said processing unit to effect a linear transformation of the certain speech feature element to obtain the normalized speech feature element.

6. An apparatus as defined in claim 4, wherein the certain transformation data element is used by said processing unit to effect a parametric transformation of the certain speech feature element to obtain the normalized speech feature element.

7. An apparatus as defined in claim 4, wherein the given transformation data element is used by said processing unit to effect a non-parametric transformation of the certain speech feature element to obtain the normalized speech feature element.

8. An apparatus as defined in claim 3, wherein the plurality of transformation data elements are grouped into sets, each set being associated to a channel type, each transformation data element in a given set being associated to a class of speech feature elements.

9. An apparatus as defined in claim 2, wherein the speech feature elements are feature vectors.

10. An apparatus as defined in claim 1, wherein the certain channel is selected from the group consisting of a wireless channel, a wire-line channel and a hands-free channel.

11. A speech recognition system comprising an apparatus for normalizing channel specific speech feature elements in a signal derived from a spoken utterance as defined in claim 1.

12. A method for normalizing speech feature elements in a signal derived from a spoken utterance, said method comprising:
   a) receiving the speech feature elements transmitted over a certain channel, the certain channel being characterized by a channel type that belongs to a group of N possible channel types, N being an integer of at least 1;
   b) altering the speech feature elements at least in part on the basis of a data element indicative of the channel type of the certain channel to generate normalized speech feature elements, the normalized speech feature elements simulating a transmission of the speech feature elements in the signal derived from the spoken utterance over a reference channel that is other than the certain channel;
   c) releasing data representative of the normalized speech feature elements.

13. A method as defined in claim 12, further comprising:
   a) assigning a certain speech feature element in the signal derived from a spoken utterance to a certain class of speech feature elements selected from a set of M possible classes at least in part on a basis of acoustic characteristics of the given speech feature element, M being an integer of at least 1;
   b) utilizing data indicative of the given class for generating a normalized speech feature element associated to the certain speech feature element.

14. A method as defined in claim 13, said method further comprising:
   a) providing a data structure for storage of a plurality of transformation data elements;
   b) extracting from the data structure at least in part on the basis of the channel type of the certain channel and at least in part of the data indicative of the certain class a certain transformation data element;
   c) processing the certain transformation data element and the certain speech feature element to generate the normalized speech feature element associated to the certain speech feature element.

15. A method as defined in claim 14, wherein each transformation data element in the data structure is associated to a respective class of speech feature elements.

16. A method as defined in claim 15, wherein the certain transformation data element is used to effect a linear transformation of the certain speech feature element to obtain the normalized speech feature element.

17. A method as defined in claim 15, wherein the certain transformation data element is used to effect a parametric transformation of the certain speech feature element to obtain the normalized speech feature element.

18. A method as defined in claim 15, wherein the given transformation data element is used to effect a non-parametric transformation of the certain speech feature element to obtain the normalized speech feature element.

19. A method as defined in claim 14, wherein the plurality of transformation data elements are grouped into sets, each set being associated to a channel type, each transformation data element in a given set being associated to a class of speech feature elements.

20. A method as defined in claim 13, wherein the speech feature elements are feature vectors.

21. A method as defined in claim 12, wherein the certain channel is selected from the group consisting of a wireless channel, a wire-line channel and a hands-free channel.

22. A computer readable medium comprising a program element suitable for execution by a computing apparatus for normalizing speech feature elements in a signal derived from a spoken utterance, said computing apparatus comprising a processor, said program element when executing on said processor being operative for:
   a) receiving the speech feature elements transmitted over a certain channel, the certain channel being characterized by a channel type that belongs to a group of N possible channel types, N being an integer of at least 1;
   b) altering the speech feature elements at least in part on the basis of a data element indicative of the channel type of the certain channel to generate normalized speech feature elements, the normalized speech feature elements simulating a transmission of the speech feature elements in the signal derived from the spoken utterance over a reference channel that is other than the certain channel;
   c) releasing data representative of the normalized speech feature elements.

23. A computer readable medium as defined in claim 22, wherein said program element when executing on said processor is further operative for:
   a) assigning a certain speech feature element in the signal derived from a spoken utterance to a certain class of speech feature elements selected from a set of M possible classes at least in part on a basis of acoustic characteristics of the given speech feature element, M being an integer of at least 1;
   b) utilizing data indicative of the given class for generating a normalized speech feature element associated to the certain speech feature element.

24. A computer readable medium as defined in claim 23, further comprising a memory unit including a data structure for storage of a plurality of transformation data elements, said program element when executing on said processor being further operative for:
   a) extracting from said data structure at least in part on the basis of the channel type of the certain channel and at least in part of the data indicative of the certain class a certain transformation data element;
   b) processing the certain transformation data element and the certain speech feature element to generate the normalized speech feature element associated to the certain speech feature element.

25. A computer readable medium as defined in claim 24, wherein each transformation data element in said data structure is associated to a respective class of speech feature elements.

26. A computer readable medium as defined in claim 25, wherein the certain transformation data element is used to effect a linear transformation of the certain speech feature element to obtain the normalized speech feature element.

27. A computer readable medium as defined in claim 25, wherein the certain transformation data element is used to effect a parametric transformation of the certain speech feature element to obtain the normalized speech feature element.

28. A computer readable medium as defined in claim 25, wherein the given transformation data element is used to effect a non-parametric transformation of the certain speech feature element to obtain the normalized speech feature element.

29. A computer readable medium as defined in claim 24, wherein the plurality of transformation data elements are grouped into sets, each set being associated to a channel type, each transformation data element in a given set being associated to a class of speech feature elements.

30. A computer readable medium as defined in claim 23, wherein the speech feature elements are feature vectors.

31. A computer readable medium as defined in claim 22, wherein the certain channel is selected from the group consisting of a wireless channel, a wire-line channel and a hands-free channel.

32. A computer readable storage medium containing a data structure that holds:
   a) a plurality of transformation sets, each transformation set including a plurality of transformation data elements;
   b) a plurality of identifiers, each identifier being associated with a respective transformation set;
   c) each transformation data element in a given set being suitable for processing with a speech feature element of a signal derived from a spoken utterance and transported in a certain channel to provide a normalized speech feature element, the normalized speech feature element simulating transmission of the speech feature element from the signal derived from a spoken utterance in a reference channel other than the certain channel.

33. An apparatus for generating a transformation set associated to a certain channel, said apparatus comprising:
   a) machine readable storage medium holding a stereo database including a plurality of data element pairs, each data element pair being derived from a spoken utterance and including:
      i. a first constituent derived from the spoken utterance conveyed over a reference communication channel that is different from the certain communication channel;
      ii. a second constituent derived from the spoken utterance conveyed by the certain communication channel;
   b) a processing unit coupled to the stereo database, said processing unit being operative for:
      i. grouping the data element pairs into respective classes, a certain data element pair being assigned to a certain class at least in part on a basis of acoustic characteristics of the certain data element pair;
      ii. processing the set of classes generated at step i. to derive a transformation set including a plurality of transformation data elements;
   c) an output coupled to the processing unit for releasing data indicative of the transformation set.

34. An apparatus as defined in claim 33, wherein a certain data element pair is associated to a certain class at least in part on a basis of acoustic characteristics of the first constituent of the certain data element pair.

35. An apparatus as defined in claim 34, wherein at least one transformation data element in the transformation set allows to perform a linear transformation operation on a speech feature from a signal derived from a spoken utterance.

36. An apparatus as defined in claim 34, wherein at least one transformation data element in the transformation set allows to perform a parametric transformation operation on a speech feature from a signal derived from a spoken utterance.

37. An apparatus as defined in claim 34, wherein at least one transformation data element in the transformation set allows to perform a non-parametric transformation operation on a speech feature from a signal derived from a spoken utterance.

38. An apparatus for normalizing speech feature elements in a signal derived from a spoken utterance, said apparatus comprising:
   a) means for receiving the speech feature elements transmitted over a certain channel, the certain channel being characterized by a channel type that belongs to a group of N possible channel types, N being an integer of at least 1;
   b) means for altering the speech feature elements at least in part on the basis of a data element indicative of the channel type of the certain channel to generate normalized speech feature elements, the normalized speech feature elements simulating a transmission of the speech feature elements in the signal derived from the spoken utterance over a reference channel that is other than the certain channel;
   c) means for releasing data representative of the normalized speech feature elements.

* * * * *

UNITED STATES PATENT AND TRADEMARK OFFICE
CERTIFICATE OF CORRECTION

PATENT NO. : 6,502,070 B1
DATED : December 31, 2002
INVENTOR(S) : Daniel Boies, Benoit Dumoulin and Stephen Douglas Peters It is certified that error appears in the above-identified patent and that said Letters Patent is hereby corrected as shown below:

Column 6,
Lines 33-35, delete "The classifier 204 is coupled to the second input 108 and it also receives the signal containing the speech feature elements."

Column 12,
Line 33, after "set of" and before "," insert -- M --.
Line 35, delete "n" and insert -- M --.

Signed and Sealed this

Twenty-eighth Day of September, 2004

JON W. DUDAS
*Director of the United States Patent and Trademark Office*